US006953499B2

(12) United States Patent
Kellens et al.

(10) Patent No.: US 6,953,499 B2
(45) Date of Patent: Oct. 11, 2005

(54) EQUIPMENT FOR PHYSICAL REFINING AND DEODORIZATION OF EDIBLE OILS AND FATS

(75) Inventors: Marc Kellens, Muizen (BE); Tony Harper, E. Yorkshire Hu (GB)

(73) Assignee: De Smet Engineering, Naamloze Vennootschap, Zaventem (DE)

(*) Notice: Subject to any disclaimer, the term of this patent is extended or adjusted under 35 U.S.C. 154(b) by 16 days.

(21) Appl. No.: 10/144,068

(22) Filed: May 14, 2002

(65) Prior Publication Data

US 2002/0169333 A1 Nov. 14, 2002

(30) Foreign Application Priority Data

May 14, 2001 (EP) .............................................. 01201766

(51) Int. Cl.$^7$ .............................................. B01D 19/00
(52) U.S. Cl. .............................. 96/181; 95/262; 96/197; 96/200; 96/215; 422/120; 426/488; 554/175
(58) Field of Search ........................... 95/159–163, 165, 95/166, 168–171, 245, 246, 248, 254, 260–265; 96/181, 194, 197–200, 215; 554/175; 422/5, 120; 426/488

(56) References Cited

U.S. PATENT DOCUMENTS

| | | | | | |
|---|---|---|---|---|---|
| 2,277,387 A | * | 3/1942 | Carney | ........................ | 208/351 |
| 2,756,841 A | * | 7/1956 | Asendorf | ..................... | 95/181 |
| 3,094,401 A | * | 6/1963 | Lidell | ........................... | 96/215 |
| 3,506,696 A | * | 4/1970 | Baker et al. | ................. | 554/205 |
| 3,747,304 A | * | 7/1973 | Elmer et al. | ................... | 96/179 |
| 3,933,953 A | * | 1/1976 | Leva | ............................ | 261/148 |
| 4,344,774 A | * | 8/1982 | Skipper | ........................ | 95/248 |
| 4,424,068 A | * | 1/1984 | McMillan | ..................... | 95/243 |
| 4,900,403 A | * | 2/1990 | Johnson | ........................ | 203/78 |
| 5,374,751 A | * | 12/1994 | Cheng et al. | ................ | 554/205 |
| 5,437,714 A | * | 8/1995 | Cook et al. | .................. | 96/201 |
| 5,470,478 A | * | 11/1995 | Leva | ............................ | 210/634 |
| 6,001,220 A | * | 12/1999 | Hillstrom et al. | ........... | 202/153 |
| 6,036,749 A | * | 3/2000 | Ribeiro et al. | ................. | 95/261 |

FOREIGN PATENT DOCUMENTS

| | | | | |
|---|---|---|---|---|
| EP | 0 520 097 | * | 12/1992 | ................. 554/175 |
| GB | 2157587 | * | 10/1985 | ................. 96/200 |
| JP | 57153725 | | 9/1982 | |
| WO | WO 98/00484 | | 1/1998 | |

OTHER PUBLICATIONS

Petrauskaite et al., Physical Refining of Coconut Oil: Effect of Crude Oil Quality and Deodorization Conditions on Neutral Oil Loss, *JAOCS*, V.77, No. 6 (2000), pp. 581–586, Jun. 2000.

Athanassiadis, A. Elimination of Air and Water Polution by Double–Stage Scrubber, *JCOS*, V.59, No. 12 (Dec. 1982), pp. 554–557.

* cited by examiner

*Primary Examiner*—Richard L. Chiesa
(74) *Attorney, Agent, or Firm*—Bacon & Thomas, PLLC

(57) ABSTRACT

Equipment for use in the physical refining and deodorization of edible oils and fats, including a shell containing a number of superimposed trays for degassing, heating, cooling and deodorization purposes. The equipment also includes a scrubber that is located at the lowest part inside the deodoriser shell.

10 Claims, 3 Drawing Sheets

EQUIPMENT FOR PHYSICAL REFINING AND DEODORIZATION OF EDIBLE OILS AND FATS

BACKGROUND OF THE INVENTION

1. Field of the Invention

The invention relates to an equipment and process used for physical refining and/or desodorisation of edible oils and fats.

More particularly, the invention relates to a process for vacuum stripping triglyceride oils and fats.

More specifically, the invention is also concerned with novel equipment used in this process.

2. Discussion of the Related Art

The invention is especially important for edible oils and fats to be sold for consumption or to be used in food products, since these outlets demand that these edible oils and/or fats have a bland taste. In addition, the invention is applicable to all kinds of edible oils and fats such as vegetable oils, animal fats and marine oils, their blends as well as to hydrogenated oils, fractionated oils, interesterification products and their blends. It will in general constitute the last step in edible oil processing before the product treated according to the invention is either packaged, or further processed into products such as for instance margarine.

In edible oil refining, two different routes are being employed. The oldest route employs a chemical neutralisation of the free fatty acids in the crude oil as obtained by expelling and/or solvent extraction. This route commonly uses caustic soda to convert these free fatty acids into sodium soaps which are then removed by a centrifugal separator and water washing. Instead of removing residual soaps by water washing, they can also be removed by adsorption by for example silica hydrogel.

Subsequently, the neutral oil is bleached by an adsorptive treatment involving the use of bleaching earth and/or activated carbon and then the malodorous compounds still present in the oil are removed by a vacuum stripping process called deodorization.

In the other route, the crude oil is first of all degummed by using an acid degumming or acid refining process to a low residual phosphorus content <10 ppm P) without removing the free fatty acids. If such a degummed oils is then bleached it can be physically refined in a vacuum stripping process that removes both the free fatty acids and the malodorous compounds so that a bland tasting product of good keepability results. Physical refining therefore combines the neutralisation and the deodorization of the oil.

The process according to the invention can be usefully applied in both the deodorization process and the physical refining process.

In the deodorization and physical refining processes already known, it is common to subject the oil to be processed to temperatures as high as 250° C. or even higher, a pressure as low as 5 mbar or even lower and to the action of a stripping medium. The commonly used stripping medium is steam but other inert gases such as for example nitrogen are also being used as described in EP-A-0.580.896 to Cheng et al. In this context, the role of the stripping medium is to dilute the volatile compounds to be removed from the oil so that they can evaporate at higher pressures than if no stripping medium were present.

For deodorization and physical refining to be effective and to minimise the stripping medium usage, the concentration of the volatile compounds to be removed from the oil should be as close as possible to the physical equilibrium concentration as determined by the vapour pressures of the pure volatile compounds at the prevailing temperature and their concentrations in the oil. To this end, intimate contact between the stripping medium and the oil to be vacuum stripped is imperative. Such contact is achieved by introducing the stripping medium under the surface of a pool of liquid oil to be deodorised through small nozzles or by spreading this oil over a large surface that is in contact with the stripping medium. The latter method as described for instance in WO 98/00484 to Hillström et al. commonly employs packed columns for this purpose.

However, when a small bubble of stripping medium is released under the surface of a pool of oil, the pressure at the point of release is equal to the sum of the system pressure and the pressure exerted by the oil column above the release point. When the bubble rises through the oil, the height of this column decreases so that the pressure inside the bubble also decreases as a result of which the bubble will expand. At the surface, the bubble will break and the gas contained in the bubble will be removed by the vacuum system. However, in doing so, the bubble will also entrain liquid oil and if this oil were to reach the vacuum system, it would be irretrievably lost and thus would constitute a yield loss. This loss is often referred to as the "neutral oil loss" or NOL.

Accordingly, most industrial deodorisers have been provided with baffles that aim at retaining the oil that is being entrained by the emerging stripping medium and thus at reducing the NOL. However, these baffles often constitute a resistance to the vapour flow and thus cause the pressure at the point where the bubble leaves the oil surface to be considerably higher than the vacuum attained by the vacuum system itself. Packed columns suffer less from NOL since in these columns the stripping medium strikes over the oil surface but then, these columns themselves present a resistance to the vapour flow so that again, the pressure "seen" by the oil can be quite a bit higher than the pressure attained by the vacuum system.

As mentioned before, oil to be deodorised or physically refined is brought to elevated temperatures since the vapour pressures of the volatile compounds to be removed by stripping increase with an increase in temperature so that their volatility increases. In order to save energy, the incoming oil is often pre-heated by the outgoing oil by an oil-to-oil heat recovery process so that external energy is only needed to raise the oil temperature from the level attained by heat exchange to the deodorization temperature. The heat exchange system and/or the final heating system can located outside the deodorization vessel proper but most installations in use incorporate these systems within the deodorization shell. The de-aeration stage on the other hand, tends to be outside this shell.

Accordingly, such a shell usually contains a number of superimposed trays from which the oil to be deodorised flows downwards by gravity. From top to bottom these trays may serve the following functions: de-aeration if this is contained within the shell, heating by heat exchange with outgoing oil, heating to final deodorization temperature, deodorization proper, cooling by heat exchange with incoming oil and finally further cooling to oil discharge temperature.

In general, all trays are sparged with stripping medium which not only strips volatiles from the oil being processed, but also ensures agitation of the oil and thus promotes heat transfer. Deodorization proper need not be confined to a single tray but may be carried out in a number of superimposed trays. Similarly, the oils can be heated or cooled after having been subjected to the first deodorization treatment before being subjected to a subsequent deodorization treatment.

If the trays within the deodoriser shell are fixed to the deodoriser shell wall and surround a central chimney which collects the vapour emerging from the trays and mechanically supports these trays, the deodoriser is generally referred to as a single shell deodoriser. Instead of a central chimney, the gases can also be removed from each tray by individual vacuum connections connected to a common duct. If an annular gap between the trays and the outer shell acts as the vapour duct, the system is referred to as a double shell deodoriser.

Flow diagrams of the various types, double shell, single shell, continuous and semi-continuous can be found in the *Practical Handbook of Soybean Processing and Utilization*, edited by D. R. Erickson, AOCS Press and United Soybean Board, 1995 on pages 251 and following. In general, a single shell deodoriser is less expensive to construct than a double shell deodoriser.

In order to maintain a low pressure within the deodorization shell, it has to be connected to a vacuum system. This system removes the stripping medium that is introduced into the shell, the volatiles entrained by this medium and any gas leaking into the shell. These volatiles have to be removed from the gas leaving the deodorization shell and to this end, the gas is commonly passed through a scrubber. In this scrubber, the hot gas is contacted with cooled distillate into which the volatiles will condense. Accordingly, the vacuum system will not have to transport these volatiles and can thus have a smaller capacity which is especially important in the case of physical refining.

This scrubber can be located in the top of the deodoriser shell and below the connection to the vacuum system.

Liquified distillate is collected at the bottom of this scrubber and then it is partially recycled to the top of the scrubber via a cooler; what is not recycled is collected in an intermediate distillate storage vessel. However, this set-up implies that the low temperature scrubber section is immediately above a hot oil tray and this puts high demands upon the construction and construction material of the deodoriser which will have to withstand considerable thermal and mechanical stress in addition to remaining vacuum tight.

Consequently, the scrubber can also be located outside the deodorization shell in the duct that connects the deodoriser to the vacuum system. If this duct is located at the top of the deodoriser shell, the scrubber is usually nearby to minimise the pressure drop in the vacuum duct. If the vapours are collected from each individual tray into a common duct, the scrubber will be located close to this common duct but that can be at the top of this duct, at the bottom of this duct or somewhere in between.

For the generation of the vacuum, steam ejectors and condensers are commonly used. Since these require barometric legs, the vacuum system requires at least 10 m height. Consequently, commonly used deodorisers display a connection to the vacuum system at the top of the vacuum shell for instance just above the scrubber if this is located within the deodoriser shell. Since gas needs a pressure difference to flow, this means that the system pressure in the lowest part inside the deodoriser shell is somewhat higher than at the top. Accordingly, the oil being deodorised is exposed to a higher pressure than the oil being heated or degassed since the heating and deaeration trays are situated above the deodorization trays. This is a drawback of this type of construction since preferably, deodorization should be carried out at the lowest pressure the vacuum system can generate.

SUMMARY

It is an object of the invention to provide equipment for the physical refining and/or deodorization of edible oils that is less subject to thermal and especially mechanical strain than currently used equipment.

It is also an object of the invention to reduce the neutral oil loss caused by entrainment.

It is a further object of the invention to ensure that oil being deodorised is exposed to as low as possible pressure and thereby reduce stripping medium usage.

It is yet another object of the invention to simplify the construction of the deodorization equipment and especially the mounting of its auxiliary vessels and equipment.

It is also an object of the invention to provide equipment for both continuous and semi-continuous operation.

It is a further object of the invention to provide a process that can profitably be used in both single shell and double shell deodorisers.

According to the invention the equipment for use in the physical refining and/or deodorization of triglyceride oils comprises a shell containing a number of superimposed trays for degassing, heating, cooling and/or deodorization purposes and a scrubber, whereby the scrubber is located at the lowest part of the deodorization shell.

The invention also relates to a process for physical refining and/or deodorization of edible oils and fats, characterised in that an equipment according to the invention is used.

The invention thus claims a process according to which the tray above the scrubber is used for de-aerating the oil entering the deodorization shell, and from this tray the degassed oil is then pumped to the top tray from where it flows down to the trays underneath by gravity.

BRIEF DESCRIPTION OF THE DRAWINGS

To more clearly show the characteristics of the invention, preferred embodiments of an equipment and a process according to the invention are described in the following, as an example without any limiting character and with reference to the accompanying drawings, wherein.

DESCRIPTION OF THE PREFERRED EMBODIMENT

Figure 1:
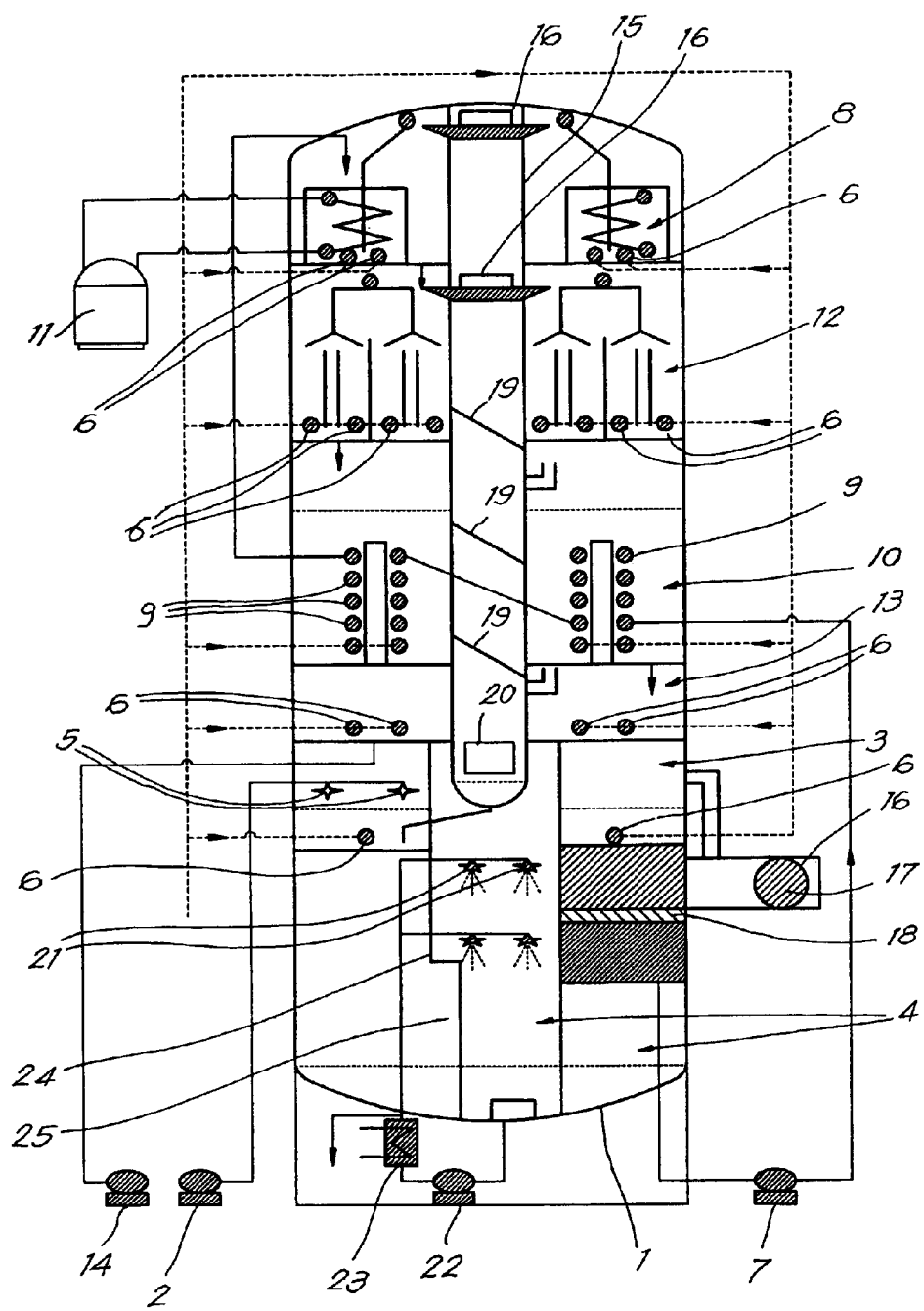
FIG. 1 shows a flow diagram of deodorization equipment according to the invention.

As indicated in FIG. 1, refined and bleached oil is continuously introduced into the deodoriser shell 1 by pump 2 into the de-aeration tray 3 located above the scrubber 4. Pump 2 forces the oil through spraying heads 5 to ensure rapid degassing of the oil.

It is also possible to provide stripping steam via inlets 6 to the de-aeration tray 3 to assist the degassing process.

At this stage, the oil temperature is for instance 90–100° C., that is to say the temperature oil normally has after having been bleached and filtered.

From tray 3, the oil is fed by means of degassed oil transfer pump 7 to the final heating/pre-stripping top tray 8 within the deodoriser shell 1 via heat exchange coils 9 located in heat recovery tray 10.

In the top tray 8, the oil is heated to deodorization temperature, for instance 230° C., by means of high pressure steam generated in boiler 11 or by means of another heat exchange medium. The final heating top tray 8 is provided with sparging steam inlets 6 to agitate the oil and promote heat transfer.

From top tray 8, the oil flows by gravity to the deodorization tray 12 underneath, where it is deodorised while being sparged with steam via inlets 6.

From tray 12, the hot oil flows by gravity to the heat recovery tray 10 where it is cooled by degassed oil and finally, the oil is cooled down to oil delivery temperature in final cooling tray 13 from where it is extracted by pump 14 as fully refined, bleached and deodorised oil.

Trays 10 and 13 are also sparged via stripping medium inlets 6 to facilitate heat transfer and also to remove malodorous components from the oil.

The vapours emerging from the various trays 3, 8, 10, 12 and 13 are collected in the central chimney 15 through regularly spaced windows 16 in the chimney wall.

From this chimney 15, they are pumped out of the deodoriser shell 1 via vacuum connection 17 after having passed fatty acid scrubber 4 and demister 18.

Some of the neutral oil entrained by the stripping medium bursting through the oil surfaces will enter the central chimney 15 which therefore has been provided with baffles 19 on its wall. These baffles 19 cause the gas stream to adopt a spiral motion so that the oil droplets are flung to this wall by centrifugal force.

The baffles 19 on the chimney wall 15 also cause the oil running down this wall to stream around its windows 16 so that this oil will collect in the bottom of chimney 15 from where it flows to the degassing tray 3 to be reprocessed. Vapours leave the central chimney through window 20 to enter the scrubber section 4.

In scrubber 4, cooled distillate is sprayed into the vapour stream through nozzles 21 causing its volatiles to condense. Pump 22 collects this distillate from the bottom pool of deodoriser shell 1 and pumps it via a cooler 23 through the spray nozzles 21 located in the vapour stream.

Distillate collected in demister 18 also trickles down into the bottom pool. Vacuum connection 17 of shell 1 is connected to one or more booster pumps and atmospheric condensers ensuring the vacuum in the system. These boosters are preferably mounted on the side of deodoriser shell 1.

In a preferred embodiment of the invention, the diameter of the cylindrical vapour enclosure 24 in the scrubber section 4 is larger than the diameter of the central chimney 15. This reduces the velocity of the vapour when it reaches the scrubber 4 and promotes condensation of the volatiles in the vapour stream by increasing residence time. This in turn reduces the carry-over of fatty matter into the vacuum system.

Figure 2:
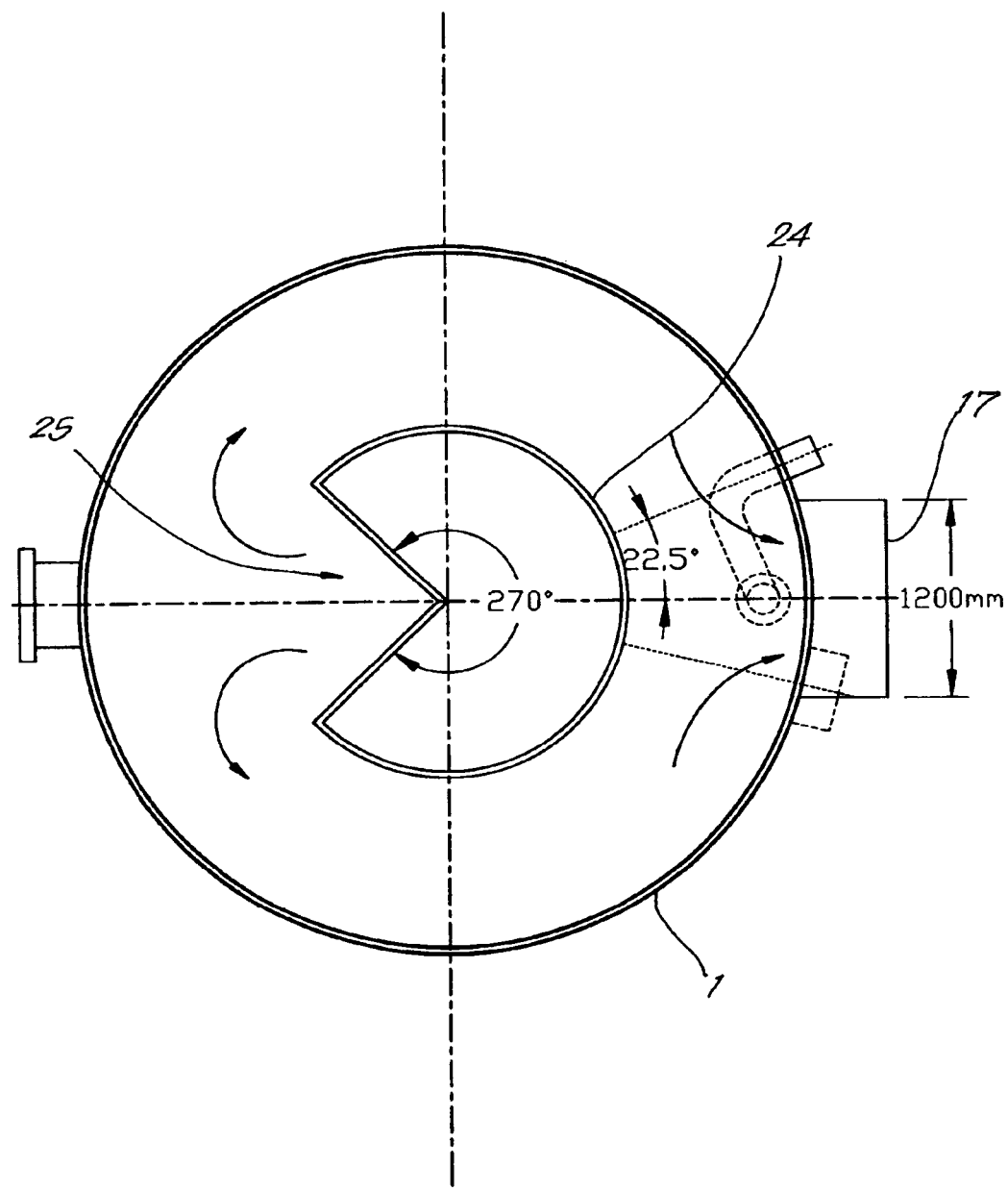
FIG. 2 represents a cross section of the bottom part of the deodoriser showing the path followed by the gases leaving the deodoriser shell.

Another way by which this carry-over is reduced even further is illustrated in FIG. 2. This figure shows the path the vapour stream has to follow to reach the vacuum system. This vapour leaves vapour enclosure 24 through a window 25 that is located opposite the vacuum connection 17.

Consequently, the vapour has to travel around half the vapour enclosure 24 before reaching vacuum connection 17. This again causes a circular motion and separation of condensate droplets by centrifugal force. These droplets collect on the wall of deodorization shell 1 and finally in its bottom pool. Because the entire cross section of the deodoriser shell is available for this path, its tortuous route will hardly cause any pressure drop so that the capacity of the vacuum generating system is fully utilised.

For simplicity's sake only a single deodorization tray 12 has been shown in FIG. 1. However, equipment with a multiple of superimposed deodorization trays also falls within the scope of the invention.

Similarly, FIG. 1 depicts a single shell deodoriser where the trays are fastened to the deodoriser wall 1, but double shell deodorisers where the trays are free from the wall and the vapours escape by passing through the annular space between these trays and the wall instead of through a central chimney, also fall within the scope of the invention.

Figure 3:
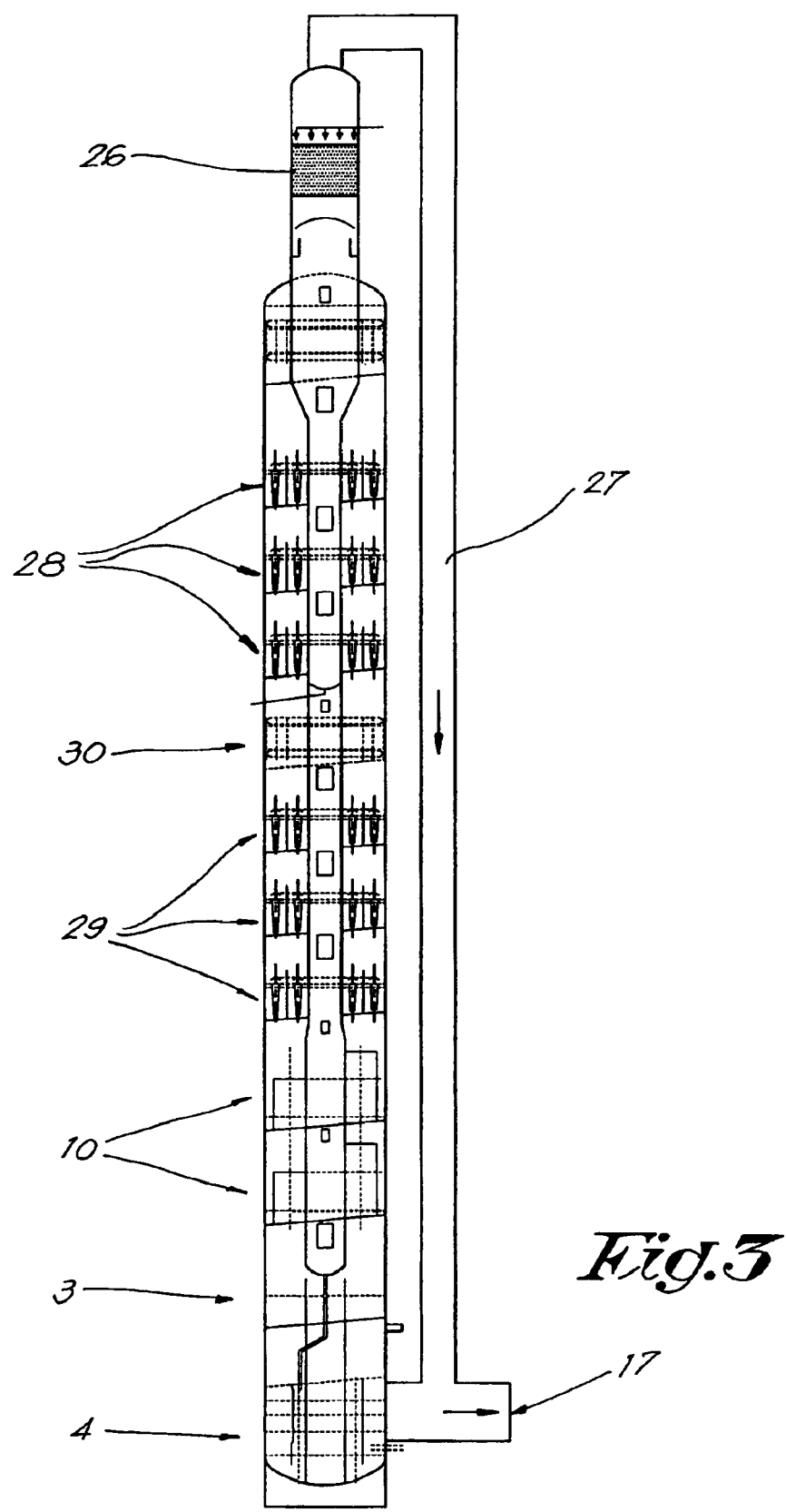
FIG. 3 shows the flow diagram of a high capacity dual temperature, dual condensation deodoriser.

According to the invention, additional heating and/or cooling trays can be introduced into the deodoriser shell 1 to allow the oil to be deodorised at different temperatures as shown in FIG. 3.

In both physical refining and deodorization, it may be found to be advantageous to treat the oil first at a fairly low temperature and to collect the bulk of the free fatty acids and volatile malodorous aldehydes and ketones, and then to heat the oil to a higher temperature to remove the residual fatty acids and, if required, also strip tocopherols and sterols and other minor constituents from the oil.

The condensate resulting from this high temperature stripping treatment will then have a relatively high content of tocopherols and sterols and other minor constituents and thus command a higher price per unit of weight than when their content was low. Besides, it will be fairly devoid of malodorous components since most of them will already have been removed during the low temperature stripping stage.

Separate collection of low and high temperature distillates requires two separate scrubber systems. According to the invention, one of these 4 should be located at the lowest part inside the deodoriser shell but, as illustrated by FIG. 3, the other scrubber 26 can be located near the top in which case this top is connected to the vacuum system by an external vapour duct 27. For constructional reasons, this second scrubber 26 is preferably located within the deodoriser shell 1 but a location outside this shell also falls within the scope of the invention.

FIG. 3, showing a flow diagram of this dual temperature and dual condensation system, refers to a high capacity deodoriser. Accordingly, it illustrates that both the low temperature treatment and the high temperature treatment occupy three trays 28 forming low temperature deodorising sections and three trays 29 forming high temperature deodorising sections, respectively and that two trays 10 are foreseen for the oil-to-oil heat recovery.

Since the first deodorization takes place at a lower temperature than the second deodorization, the flow diagram also incorporates an intermediate high temperature heating section 30.

The flow diagram of FIG. 3 illustrates a system whereby the vapours emerging from the various trays are treated in either of two scrubbers (top vapour scrubber 26 or bottom vapour scrubber 4), but a system whereby all vapours are treated in two scrubbers in series also falls within the scope of the invention, provided one of these scrubbers is located in the lowest part inside the deodoriser shell 1.

The first of these two scrubbers can be operated at a rather high temperature so that it will condense vapours with a high boiling point such as partial glycerides. The second of these scrubbers should be operated at a much lower temperature to really free the vapours from condensibles. This system has particular advantages for the physical refining and/or deodorization of lauric oils, especially when the condensate from the high temperature scrubber is recycled so that loss of partial glycerides is minimised.

A combination of the dual temperature, dual condensation system, whereby one or even both of the condensation systems consist of two scrubbers in series constitutes an embodiment of the invention provided one of the scrubbers of this system is located in the lowest part inside of the deodoriser shell.

FIGS. 1 and 3 refer to a fully continuous deodorization process but by providing the various trays with appropriate outlet valves, a semi-continuous operation according to the invention is also possible. In that case, returning splash oil to the de-aeration tray may have to be suspended to avoid cross contamination between subsequent charges.

Although it is common to use trays with more or less shallow pools of oil in physical refining and/or deodorization, packed columns are also used industrially for these processes.

When such columns are used, the oil is allowed to trickle down the packing while the stripping medium is passed counter-currently along the oil film on the packing.

Such columns can also be incorporated into the equipment according to the invention by replacing one or more deodorization trays. In that case, the vapours leaving the top of the packed column are to be guided to an annular space between the column and the deodoriser shell and from there into the central chimney if the deodoriser comprises only a single scrubber.

In case of a dual condensation system, the vapours exiting the top of the column can for example be condensed in the scrubber 26 located at the top of the deodoriser shell.

According to the invention it is not necessary but only preferable to incorporate the de-aeration tray inside the deodoriser shell. The flow diagram of FIG. 1 shows a situation whereby the degassing stage is performed by spraying the oil to de deodorised into vacuum inside the deodorising shell but this can also be done in a separate vessel outside the shell. Then the tray above the scrubber will be used for heat exchange purposes.

However, from a constructional point of view there are advantages in having the coldest section scrubbing at the lowest part of the deodoriser, having a section at a somewhat higher temperature degassing above the coldest section, having a section with a still higher temperature oil-to-oil heat recovery superimposed upon the degassing section and only then allow of a further increase of the tray temperature as needed by deodorization.

In summary, the advantages of the equipment and process according to the invention over the present state of the art can be listed as follows, whereby it should be noted that these advantages far outweigh the cost of the additional pump 7 lifting the degassed oil to the top tray 8 according to the invention:

Reduced neutral oil loss since splash oil is effectively separated from the gas stream in the central chimney and/or the vapour path inside the scrubber and thus recuperated automatically within the system;

Improved vapour scrubbing and condensation leading to reduced fouling of the hot wells in the vacuum system;

Reduced pressure drop over the scrubber section;

Proximity of the final deodorization tray to the scrubber so that this tray is exposed to the lowest possible system pressure;

Minimisation of thermal and thus mechanical strains in the equipment by the separation of high and low temperature trays by intermediate temperature trays;

Self supporting structure that is easy and fast to erect, that does not require to be housed inside a building and requires little floor space;

Adaptability in that existing deodorisers according to the invention can be easily upgraded by adding further trays;

Near absence of auxiliary vessels.

What is claimed is:

1. Equipment for use in the physical refining and/or deodorization of edible oils and fats, comprising a deodorizer shell containing a number of superimposed trays for degassing, heating, cooling and/or deodorization purposes and containing one or more scrubbers, wherein one of said scrubbers is located at the lowest part inside the deodoriser shell and includes a scrubbing zone having a bottom pool containing cooled distillate and at least one spray nozzle arranged to spray said cooled distillate into the scrubbing zone.

2. The equipment according to claim 1, comprising a deodorizer of the double shell construction.

3. The equipment according to claim 1, including a counter-current packed column that has replaced a deodorizer tray.

4. The equipment according to claim 1, including two or more deodorization sections operating at different temperatures.

5. The equipment according to claim 1, including valves arranged to permit semi-continuous operation.

6. The equipment according to claim 1, wherein said equipment has two scrubbers, one scrubber being located at the lowest part inside the deodorizer shell and the other scrubber being located within said deodorizer shell.

7. The equipment according to claim 1, further comprising a pump for pumping the oil from the tray above said scrubber located at the lowest part inside the deodorizer shell to the top tray within the deodorizer shell.

8. Equipment for use in the physical refining and deodorization of edible oils and fats, comprising:

a deodorizer shell containing a number of superimposed trays for degassing, heating, cooling and deodorization purposes, the deodorizer having a single shell construction and including a central chimney provided with windows for extraction of gases, and baffles arranged to prevent oil from leaving the chimney through the windows; and one or more scrubbers, wherein one scrubber is located at the lowest part inside the deodorizer shell; and wherein the central chimney of the deodorizer shell is arranged to provide a gas stream with a spiral motion before the gas stream enters the scrubber through a window opening into the scrubber.

9. Equipment for use in the physical refining and/or deodorization of edible oils and fats, comprising a deodorizer shell containing a number of superimposed trays for degassing, heating, cooling and/or deodorization purposes, wherein said equipment has two scrubbers, one scrubber being located at the lowest part inside the deodorizer shell and the other scrubber being located near the top of the said deodorizer shell.

10. Equipment for use in the physical refining and/or deodorization of edible oils and fats, comprising a deodorizer shell containing a number of superimposed trays for degassing, heating, cooling and/or deodorization purposes, wherein said equipment has two scrubbers, one scrubber being located at the lowest part inside the deodorizer shell and the other scrubber being located outside said deodorizer shell.

* * * * *